Oct. 18, 1960     L. MUHLFELDER     2,956,398
RAM JET CONTROL

Filed Oct. 31, 1955     2 Sheets-Sheet 1

INVENTOR.
LUDWIG MUHLFELDER
BY *Victor D. Behr*
ATTORNEY

Oct. 18, 1960 L. MUHLFELDER 2,956,398
RAM JET CONTROL
Filed Oct. 31, 1955 2 Sheets-Sheet 2
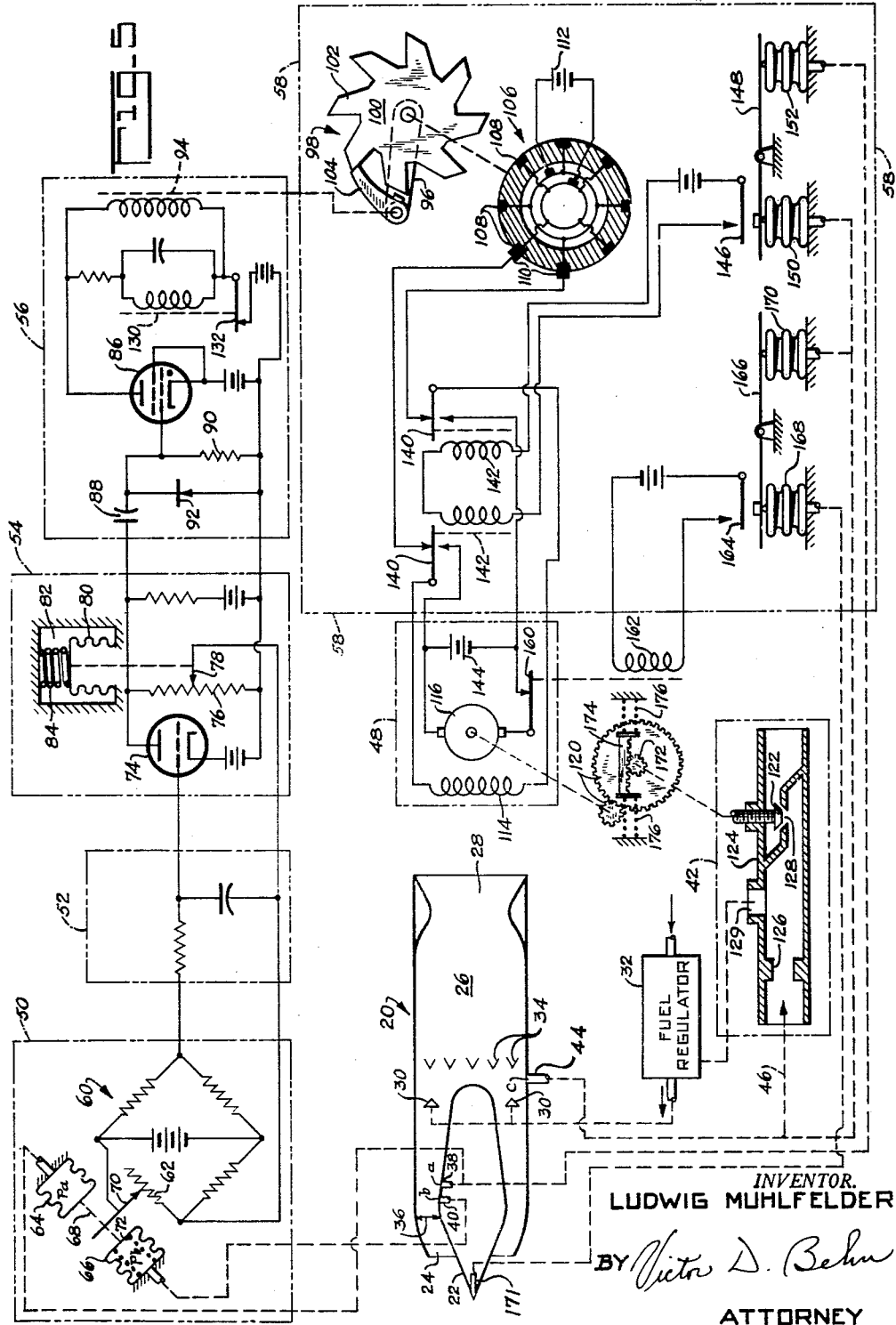
INVENTOR.
LUDWIG MUHLFELDER
BY Victor D. Behn
ATTORNEY United States Patent Office 2,956,398
Patented Oct. 18, 1960

2,956,398

RAM JET CONTROL

Ludwig Muhlfelder, Belleville, N.J., assignor to Curtiss-Wright Corporation, a corporation of Delaware Filed Oct. 31, 1955, Ser. No. 543,872

8 Claims. (Cl. 60—35.6)

This invention relates to jet engine control systems and is particularly directed to a control system for jet engines which take in air from the surrounding atmosphere for combustion and are designed for supersonic flight.

The invention is primarily designed for use with a ram-jet engine. Such an engine comprises a duct-like structure having a forwardly directed air inlet at its forward end, a rearwardly directed exhaust nozzle at its aft end and a combustion chamber intermediate said ends. The thrust of a ram-jet engine increases with increase in the rate at which air enters the engine and the more efficiently said air is used the lower the specific fuel consumption (fuel consumption per unit thrust output) of the engine. It is generally desirable therefore that a ram-jet engine operate so that there is as high a conversion as possible of the air inlet entering velocity to pressure, that is, at as high a pressure recovery of said inlet as possible. At supersonic flight speeds air enters the ram-jet inlet at supersonic velocities but the velocity entering the engine combustion chamber is subsonic. Accordingly a strong or normal shock wave exists in the inlet at the transition region from supersonic to subsonic flow and in general this shock wave is at or downstream of the inlet throat.

It is known that the static pressure downstream of said strong inlet shock wave is substantially higher than the pressure upstream therefrom. The actual position of this strong shock wave in the inlet can be controlled by varying the magnitude of the pressure on its downstream side. Any increase in the resistance to flow through the engine downstream of said shock wave, for example as a result of an increase in the fuel-air ratio of the engine fuel supply or of a closing adjustment of the engine exhaust nozzle, causes an increase in the pressure on the downstream side of said strong shock wave whereupon this shock wave moves to a more upstream position. Likewise any decrease in said flow resistance causes a decrease in said downstream pressure whereupon said strong shock wave moves to a more downstream position. Thus the inlet pressure recovery increases and decreases with movement of said strong shock wave in upstream and downstream directions respectively in the inlet.

For stable operation, the inlet strong shock wave (marking the transition between supersonic and subsonic flow) should be disposed at the ram-jet inlet throat or downstream therefrom. If the inlet is operating at too high a pressure recovery, the high pressure downstream of the shock wave causes the shock wave to move completely out of the inlet whereupon a portion of the approaching air, which would otherwise enter the inlet, spills out around the inlet. As a result of this air spillage the air flow into the engine decreases whereupon the pressure drops within the engine and the shock wave moves back into the inlet. As the shock wave moves back into the inlet, the pressure on its downstream side will again increase to said high value again causing said shock wave to move upstream out of the inlet. Accordingly it is apparent that if the inlet of a ram-jet engine operates at too high a pressure recovery the position of the inlet strong shock wave may become unstable and oscillate back and forth into and out of the inlet. This type of aerodynamic instability of an engine air inlet is generally known as "buzz" and is highly undesirable because of the severe pressure fluctuations resulting from rapid oscillation of the inlet shock wave. This phenomenon of buzz is not confined to ram-jet engines. Buzz may occur in any jet engine which takes in air at supersonic velocity.

An object of the present invention comprises the provision of a novel jet engine control system which automatically provides for operation of the engine at high inlet pressure recovery without danger of inlet buzz. A further object of the invention comprises the provision of novel system for controlling the operation of a ram-jet engine in response to changes in a condition which has a peak value when the engine air inlet is operating close to but slightly below its peak pressure recovery.

It has been found that the difference or the ratio of the static pressures in the inlet of a ram-jet engine at two spaced points both disposed downstream of the inlet throat has a peak value when the inlet pressure recovery is only slightly below its peak value. Accordingly, a still further object of the invention comprises the provision of a novel ram-jet control system in which the engine fuel supply is regulated so as to maintain said static pressure difference or ratio substantially at its peak value.

Other objects of the invention will become apparent upon reading the annexed detailed description in connection with the drawing in which:

Fig. 5 is a view similar to Fig. 4 but illustrating the details of the system.

Figure 1:
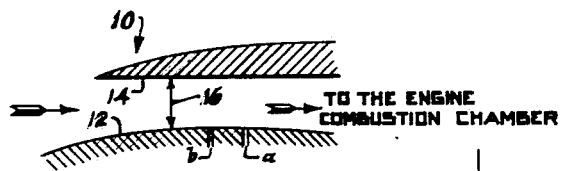
Fig. 1 is a partial view illustrating a conventional air inlet for a jet engine.

Referring first to Fig. 1 of the drawing, there is illustrated an air inlet of a ram-jet engine, said inlet being designated by reference numeral 10. The passage of the inlet 10 is formed by an inner wall 12 and an outer wall 14 such that the inlet has a restricted area or throat 16. The inlet throat 16 may be at the inlet entrance or as illustrated may be disposed downstream therefrom.

When the strong shock wave marking the transition between the entering supersonic flow and the subsonic flow downstream therefrom has entered the inlet and is disposed at or downstream of the inlet throat the inlet is said to have started. Assume for the moment that the inlet has started and this strong shock wave is disposed a substantial distance downstream of the inlet throat 16 and of two spaced points a and b both of which points are also disposed downstream of the inlet throat with the point a being downstream of the point b. With this condition, the static pressure at the point a is higher than that at the point b. Now if the fuel-air ratio of the engine combustion mixture is increased and/or the engine nozzle area is reduced the inlet pressure recovery will increase so that the pressure downstream of said strong shock wave increases whereupon this shock wave moves in an upstream direction. As this happens, the static pressure at each of the points $a$ and $b$ will remain substantially constant until the shock wave gets close to the point $a$. Any further upstream movement of the shock wave will cause the pressure at the point $a$ to rise. Thereafter as the shock wave approaches the point $b$ the pressure at the point $b$ will also start to rise. As the pressure recovery of the inlet is further increased, so that the shock wave continues to move in an upstream direction, the static pressure at points $a$ and $b$ both continue to rise and they each reach a maximum value when the inlet is at its peak pressure recovery for the conditions under which it is operating. At this time said strong shock wave is at the inlet throat.

Figure 2:
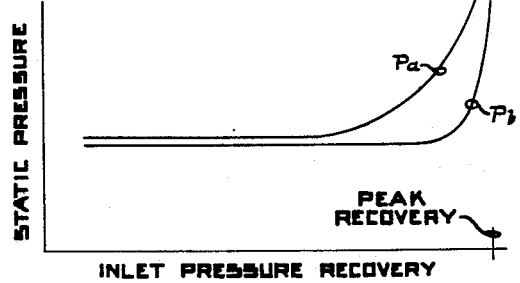
Fig. 2 is a graph showing the static pressure changes at two spaced points in the inlet of Fig. 1 with changes in the inlet pressure recovery.
Figure 3:
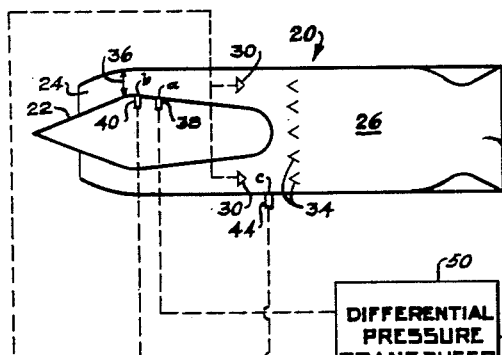
Fig. 3 is a graph showing the variation of the difference of said two static pressures with changes in the inlet pressure recovery.
Figure 3:
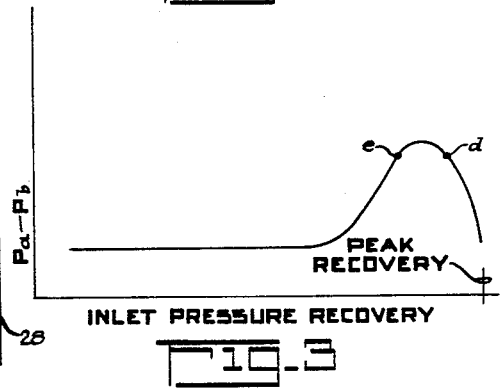

This variation in the static pressure at each of the inlet points $a$ and $b$ is graphically shown in Fig. 2 in which $Pa$ designates the pressure at the point $a$ and $Pb$ the pressure at the point $b$. If now the difference between the pressures $Pa$ and $Pb$ is plotted against the inlet pressure recovery a curve such as illustrated in Fig. 3 is obtained. As illustrated, the pressure difference ($Pa-Pb$) has a peak value when the inlet is operating just below its peak pressure recovery. The hereinafter described embodiment of the invention (Figs. 4 and 5) discloses a ram-jet engine in which this inlet pressure difference is used to control the fuel-air ratio of the engine combustion mixture so as to maintain this pressure difference substantially at its peak value whereby the engine is always operating with its inlet substantially at but slightly below peak pressure recovery.

Figure 4:
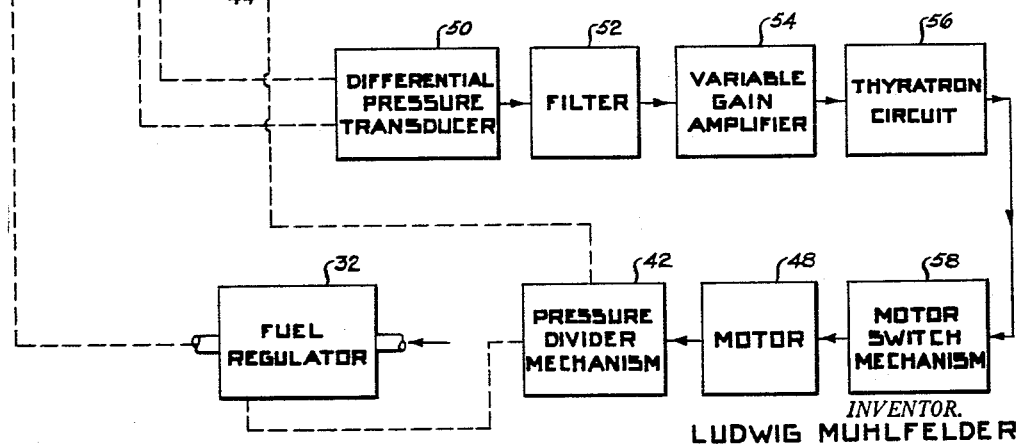
Fig. 4 is a schematic block diagram of a ram-jet control system embodying the invention.

Fig. 4 discloses a ram-jet engine 20 having a nose portion 22 forming an annular forwardly directed air inlet 24, a combustion chamber 26 and a rearwardly directed exhaust nozzle 28. Fuel is supplied to the combustion chamber 26 through fuel nozzles 30 under the control of a fuel regulator mechanism 32. Flameholder apparatus 34 is schematically illustrated in the combustion chamber 26. The air inlet 24 has a throat portion 36 and static pressure taps 38 and 40 opening into the inlet at spaced points $a$ and $b$ both disposed downstream of the inlet throat with the point $a$ being downstream of the point $b$. Thus the points $a$ and $b$ of Fig. 4 correspond to the points $a$ and $b$ of Fig. 1 and the difference in pressure between these points in Fig. 4 ($Pa-Pb$) will vary with the pressure recovery of the inlet 24 in the manner illustrated in Fig. 3.

The fuel regulator mechanism 32 preferably is similar to the fuel regulator mechanism disclosed in copending application Serial No. 286,364, filed May 6, 1952, now Patent Number 2,766,579. As disclosed in said copending application such a mechanism 32 controls the rate of fuel supplied thereby in proportion to the magnitude of a control pressure applied to said mechanism. Accordingly when a pressure, which is proportional to the mass rate of air flow into the engine, is applied as the control pressure to the fuel regulator mechanism 32, said mechanism operates to maintain the rate of fuel flow to the engine proportional to the rate of mass air flow to the engine thereby maintaining a constant fuel-air ratio of the combustion mixture supplied to the combustion chamber 26.

The control pressure applied to the mechanism 32 is obtained from a pressure divider mechanism 42 to which is supplied a pressure which is a measure of the mass rate of air flow into the engine. A suitable pressure for this purpose is the static pressure in the engine combustion chamber 26. Because of the lower temperatures, this pressure preferably is measured upstream of the flame holder apparatus 34 in the combustion chamber 26, that is at the burner entrance. Thus this pressure is measured by a static pressure tube 44, at the point $c$ in the combustion chamber, which is connected to the pressure divider mechanism 42 by a passage 46.

In lieu of the burner entrance pressure ($Pc$) measured by the static pressure tube 44, other pressures which are a measure of the rate of mass air flow into the engine may be used for providing the control pressure to the fuel regulator mechanism 32. For example, as explained in said copending application, the impact pressure of the surrounding free air stream may be used for this purpose.

As hereinafter explained, the pressure divider mechanism 42 is continually adjusted by a motor 48 to vary the ratio between said burner entrance pressure and the control pressure applied to the fuel regulator mechanism whereby the magnitude of said fuel-air ratio is continually being changed and therefore the pressure recovery of the inlet 24 is continually changing. As a result of this continual adjustment of the inlet pressure recovery the pressure differential $Pa-Pb$ varies in the manner illustrated in Fig. 3.

The pressure taps 38 and 40 are connected to a differential pressure transducer 50 to provide an electrical signal which is a measure of the static pressure difference between the points $a$ and $b$ ($Pa-Pb$). This electric signal is supplied to a filter 52 which filters out high frequency vibrations (noise) produced by high frequency pressure fluctuations resulting from engine operation. The filtered signal is then fed to an amplifier 54. The amplifier 54 has a variable gain control as hereinafter described. The amplified signal is then supplied to a thyratron circuit 56 controlling a motor switch mechanism 58 which in turn controls the direction of rotation of the motor 48. The thyratron circuit 56 is arranged so that every time the direction in which the amplified electric signal is changing reverses to a predetermined extent, as a result of the magnitude of the pressure difference $Pa-Pb$ going through its peak value to a predetermined extent, the thyratron circuit is effective to operate the switch mechanism 58 to reverse the direction of the motor 48. Thus if the motor 48 is operating in a direction to cause a progressive increase in the fuel-air ratio of the combustion mixture the inlet pressure recovery is progressively increasing so that the pressure difference $Pa-Pb$ is moving to the right along the curve of Fig. 3. When this pressure difference has gone beyond its peak value to a predetermined extent, for example to point $d$ of Fig. 3, the thyratron circuit is effective to operate the motor switch mechanism 58 to reverse the direction of the motor 48. After this reversal, the fuel-air ratio and inlet pressure recovery will progressively decrease whereupon the direction in which the pressure difference $Pa-Pb$ is changing will reverse and this pressure difference will again move toward its peak value. When this pressure difference has again gone beyond its peak value (now to the left along Fig. 3) to a predetermined extent, for example to point $e$, Fig. 3, the thyratron circuit is again effective to reverse the direction of the motor 48. In this way the fuel-air ratio is continually adjusted so as to maintain the pressure difference $Pa-Pb$ substantially at its peak value (between the points $d$ and $e$ of Fig. 3) whereby the engine operates with its inlet substantially at but slightly below peak pressure recovery.

Details of the elements of the control system of Fig. 4 are illustrated in Fig. 5. As illustrated in Fig. 5, the differential pressure transducer 50 comprises a direct current (D.C.) Wheatstone bridge circuit 60 having an adjustable resistance 62 as one of the arms of the bridge. A pair of bellows 64 and 66 have their movable ends connected together in opposition, as indicated at 68, and the movable contact 70 of the resistance 62 is connected to the connection 68 for movement therewith. The bellows 64 is connected to the pressure tap 38 so as to be responsive to the pressure $Pa$ and the bellows 66 is connected to the pressure tap 40 so as to be responsive to the lower pressure $Pb$. A spring 72 is provided to balance the bellows force produced by the pressure difference $Pa-Pb$ whereby the magnitude of the adjustment of the resistance 62 is proportional to the pressure difference $Pa-Pb$. The Wheatstone bridge circuit is arranged so that its output voltage increases and decreases with increase and decrease in the pressure difference $Pa-Pb$.

The output voltage signal of the Wheatstone bridge circuit of the transducer 50 is supplied to a conventional filter 52 which as previously stated filters out the high frequency electric vibrations resulting from engine operation. The filtered signal is supplied to an amplifier 54 which includes the vacuum tube triode 74 and a potentiometer resistance 76 having a movable contact 78 for varying the gain of the amplifier. The movable contact 78 is connected to a bellows 80 closing an evacuated space 82. The outside of the bellows is subjected to the pressure of the surrounding atmosphere and a spring 84 balances the fluid pressure difference across said bellows whereby the potentiometer contact 78 is automatically adjusted in response to changes in the pressure of the surrounding atmosphere. The circuit is arranged so that the gain of the amplifier 54 is automatically increased with increase in altitude. This automatic increase in gain of the amplifier 54 is provided to compensate for the decrease in the pressure difference $Pa-Pb$ with increase of altitude.

The amplifier 54 is connected to the thyratron circuit 56 which includes a thyratron tube 86, a condenser 88 connected between the control grid of said tube and the amplifier 54 and a resistance 90 and a rectifier 92 connected in parallel between said control grid and the cathode of the tube 86. The circuit is arranged so that when the pressure difference $Pa-Pb$ is increasing toward its peak value there is a flow of current in the low resistance direction of the rectifier 92 to charge the condenser 88. Because of the low resistance of the rectifier 92 to current flow in this direction the voltage between the control grid and cathode of the tube 86 is quite low. When the pressure difference $Pa-Pb$ passes its peak value and starts to decrease, the condenser discharges through the resistance 90. As a result the potential of the control grid of the tube 86 becomes positive relative to the tube cathode. When the pressure difference $Pa-Pb$ has decreased sufficiently the positive potential of the control grid becomes high enough to cause the thyratron tube 86 to be discharged.

The output circuit of the thyratron tube 86 includes the solenoid winding of an electromagnet 94 which is operatively connected to a movable arm 96 of a ratchet device 98, said device forming part of the motor switch mechanism 58. The ratchet device 98 consists of a rotor member 100 having a plurality of teeth 102 engageable by a pawl 104 pivotally mounted on the outer end of the arm 96. The solenoid 94 and ratchet 98 are arranged so that each time the solenoid is energized the rotor of the ratchet device is rotatively stepped one rotor tooth.

The ratchet rotor member 100 is connected to the rotor member of a reversing switch device 106 having a plurality of circumferentially spaced contacts 108. A pair of fixed contacts 110 are disposed for engagement with an adjacent pair of contacts 108. As illustrated, every other contact 108 is connected to one side of a source of electric energy 112 and the other contacts 108 are connected to the other side. The arrangement is such that each time the ratchet rotor member 100 is stepped one tooth it rotates the rotor member of the switch device 106 to reverse the polarity of the contacts 110.

The pair of contacts 110 are connected in opposite sides of the circuit of the field winding 114 of the motor 48. Accordingly each time the contacts 110 reverse polarity there is a reversal of the direction of rotation of the armature 116 of the motor 48. The motor armature is drivably connected, by means including gears 120, to a valve 122 of the pressure divider mechanism 42. The mechanism 42 includes a conduit 124 having a restricted opening 126 at one end and variable restricted opening 128 controlled by the valve 122 at the other end. The end of the conduit adjacent the opening 126 is connected to the static pressure tube 44 and the other end of said tube opens into the surrounding atmosphere. A tap 129 to the conduit 124 between the restricted openings 126 and 128 supplies the control pressure to the fuel regulator 32. The ratio of this control pressure to the burner entrance pressure (as measured by the static pressure tube 44) obviously increases and decreases with closing and opening adjustment of the valve 122. As previously explained the fuel-air ratio of the combustible mixture supplied to combustion chamber 26 increases and decreases as this ratio of the control pressure to the burner entrance pressure increases and decreases. This latter ratio can be made independent of changes in the pressure of the surrounding atmosphere if the range of adjustment of the valve 122 is so limited that the pressure drop across this valve is greater than the critical value.

The thyratron circuit 56 also includes a winding of a relay 130 in the output plate circuit of the thyratron tube. The relay 130 controls a switch 132 which is closed whenever the thyratron tube is not discharging. The relay 130 is arranged to operate slower than the ratchet operating electromagnet 94. After the ratchet operating electromagnet has operated to reverse the direction of operation of the motor 48, the relay 130 operates to open the switch 132 thereby opening the plate circuit of the thyratron tube. The thyratron tube immediately stops discharging whereupon the electromagnet 94 returns to its original position to move the ratchet pawl 104 into engagement with the next ratchet tooth 102 and the switch 130 closes to return control of the thyratron tube to its control grid. The thyratron circuit is now ready to repeat its operation when the pressure differential $Pa-Pb$ again goes through its peak value.

In the event the fuel-air ratio of the combustion mixture should become unduly lean means are provided to control the motor 48 independently of the reversing switch device 106. For this purpose, as illustrated in Fig. 5, a pair of single-pole double-throw switches 140 are disposed in each side of the motor field winding 114. In their positions illustrated, the switches 140 connect the field winding 114 to the electric energy source 112 through the contacts of the reversing device 106. A pair of relays 142 are provided, said relays when energized operating the switches 140 to connect the field winding 114 to the source of electric energy 144 so as to insure operation of the motor 48 in a direction to increase the fuel-air ratio. The relays 142 are controlled by a normally open switch 146 which in turn is controlled by a lever 148. A bellows 150 exerts a turning force on the lever 148, said bellows being connected to the burner entrance static pressure tap 44 so as to be responsive to the static pressure Pc. A second bellows 152 acts on the lever in opposition to the bellows 150. The bellows 152 is connected to the point $a$ in the engine inlet so as to respond to the pressure Pa. When the engine is operating so the pressure difference $Pa-Pb$ is near its peak, the pressure Pa will be slightly less than Pc. The moment arms of the bellows 150 and 152 on the lever 148 are such that when this is the case the switch 146 remains open. However if fuel-air ratio of the engine combustion mixture should become quite lean (low fuel-air ratio) the pressure Pa will drop relative to Pc and at a predetermined pressure difference the lever 148 will close the switch 146 to operate the relays 142. As previously stated when this happens the field circuit of the motor 48 is energized independently of the switching device 106 in a direction to insure operation of the motor 48 in a fuel-air ratio increasing direction.

As illustrated in Fig. 5, means are also provided for automatically setting the pressure divider valve 122 at a predetermined position should buzz occur or should the burner flame be extinguished. For this purpose a switch 160 is inserted in the circuit of the motor armature. A relay 162 is connected to the switch 160 for opening the switch when the relay is energized. The relay 162 is controlled by a normal open switch 164 which in turn is controlled by a lever 166. A pair of bellows 168 and 170 exert opposed fluid pressure forces on the lever 166. The bellows 168 is connected to a total head tube 171 mounted at the nose of the centerbody 22 so that the bellows 168 is responsive to the impact pressure of the surrounding free air stream. The bellows 170 is connected to the static pressure tap 44 at the point $c$ in the combustion chamber 26. When the engine is operating with combustion in its chamber 26 the switch 164 remains open because the static pressure $Pc$ at the point $c$ normally is higher than the free stream impact pressure as measured by the tube 171. This is so because of the shock pressure losses at the total head tube 171. However, should the combustion flame be extinguished for any reason or should buzz occur, the pressure at the point $c$ will drop below said impact pressure. Thereupon the lever 166 will rotate to close the switch 164 and energize the relay 162 which in turn operates to open the switch 160 in the circuit of the motor armature 116 whereupon the motor 48 is de-energized. One of the shafts in the connection from the motor armature 116 to the valve 122 has a gear 172 meshing with a rack 174 urged to an intermediate position by opposed springs 176. Hence when the motor 48 is thus de-energized, the springs 176 move the valve 122 to an intermediate position. This intermediate position is chosen so as to provide a control pressure signal to the fuel regulator 32 which results in a fuel-air ratio which although not the optimum ratio is safe as far as buzz is concerned and is suitable for ignition or re-ignition of the engine combustion mixture.

With the system illustrated, the fuel regulator 32 primarily responds to changes in the pressure measured by the static pressure tube 44 to increase and decrease the fuel supply with increase and decrease in this pressure. In addition, the proportion of this pressure supplied to the fuel regulator 32 as a control pressure is continually being adjusted by the motor 48 and valve 122 to keep the pressure recovery of the inlet just below its maximum value. Thus the fuel regulation produced by continuous adjustment of the valve 122 in effect provides a trimming or secondary control of the fuel supply. This trimming or secondary type of control is desirable because of the relatively slow response of the circuit controlling the operation of the motor 48. It is possible however for the motor 48 to directly control the fuel supply by connecting said motor to a main fuel control valve instead of to a secondary valve, such as the valve 122.

A curve showing the variation of the pressure ratio $Pa/Pb$ with inlet pressure recovery has the same general shape as the curve of Fig. 3. Thus the pressure ratio $Pa/Pb$, like the pressure difference $Pa-Pb$, has a maximum value at a point slightly below maximum inlet pressure recovery. Accordingly, the differential pressure transducer 50 obviously could be arranged to be responsive to the pressure ratio $Pa/Pb$ instead of the pressure difference $Pa-Pb$. For this reason the phrase "relative magnitude" of two factors, as used in the claims, is intended to be broad enough to cover both the difference and ratio of said factors.

If instead of the ratio $Pa/Pb$ the ratio $Pb/Pa$ were plotted against the inlet pressure recovery, the resulting curve would have a minimum instead of a maximum value slightly before maximum inlet pressure recovery. The thyratron circuit 56 responds to a reversal of the direction in which the signal is changing. Such a reversal takes place at a minimum as well as at a maximum point and the thyratron circuit 56 does not distinguish as to whether the reversal is the result of the signal going through a maximum or a minimum value. Accordingly, as far as the invention is concerned a function having either a minimum or a maximum point just before maximum pressure recovery of the inlet could be used. For this reason the term "peak" as used in the claims is intended to be broad enough to mean either a minimum or a maximum value of such a function.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A control system for a jet engine having an air inlet through which air enters at supersonic velocity during engine operation; said system comprising means providing a signal which has a peak value when the engine is operating substantially at but somewhat below peak pressure recovery of the inlet; means operable to vary the engine fuel supply rate; reversible motor means operatively connected to said fuel supply varying means, said motor means continuously operating during engine operation and having first and second directions of operation for increasing and decreasing, respectively, said engine fuel supply rate; means responsive to said signal for reversing the direction of operation of said motor means every time said signal goes through its said peak value such that operation of said motor means is initiated in a direction to increase said fuel flow when said inlet has started and said signal is a predetermined amount less than its peak value and on the side of said peak value corresponding to inlet pressure recovery substantially less than peak pressure recovery and operation of said motor means is initiated in the reverse direction to decrease said fuel flow when said signal is on the other side of and a predetermined amount less than its peak value.

2. A control system for a jet engine having an air inlet through which air enters at supersonic velocity during engine operation; said system comprising means responsive to the pressure at a first point in said inlet downstream of the inlet throat; means responsive to the pressure at a second point in said inlet downstream of the inlet throat and spaced from said first point; means operable during engine operation to vary the pressure in said inlet downstream of the inlet throat; reversible motor means operatively connected to said pressure varying means, said reversible motor means continuously operating during engine operation and having first and second directions of operation for increasing and decreasing, respectively, said inlet pressure; means responsive to changes in the relative magnitude of the pressures at said two spaced points; and means controlled by said responsive means for reversing the direction of operation of said motor means every time the relative magnitude of the pressures at said two spaced points goes through a peak value such that operation of said motor means is initiated in a direction to increase said fuel flow when said inlet has started and said relative pressure magnitude is a predetermined amount less than its peak value and on the side of said peak value corresponding to inlet pressure recovery substantially less than peak pressure recovery and operation of said motor means is initiated in the reverse direction to decrease said fuel flow when said relative pressure magnitude is on the other side of and a predetermined amount less than its peak value.

3. A control system for a jet engine having an air inlet through which air enters at supersonic velocity during engine operation; said system comprising means responsive to the static pressure at a first point in said inlet downstream of the inlet throat; means responsive to the static pressure at a second point in said inlet downstream of the inlet throat and spaced from said first point; means operable for varying the rate of engine fuel supply; reversible motor means operatively connected to said fuel supply varying means, said reversible motor means continuously operating during engine operation and having first and second directions of operation for increasing and decreasing, respectively, said engine fuel supply rate; means responsive to changes in the relative magnitude of said pressures; and means controlled by said responsive means for reversing the direction of operation of said motor means every time the relative magnitude of said pressures goes through a peak value such that operation of said motor means is initiated in a direction to increase said fuel flow when said inlet has started and said relative pressure magnitude is a predetermined amount less than its peak value and on the side of said peak value corresponding to inlet pressure recovery substantially less than peak pressure recovery and operation of said motor means is initiated in the reverse direction to decrease said fuel flow when said relative pressure magnitude is on the other side of and a predetermined amount less than its peak value.

4. A control system for a jet engine having an air inlet through which air enters at supersonic velocity during engine operation; said systems comprising a main regulating mechanism for controlling the rate of engine fuel supply; auxiliary regulating mechanism operable for modifying said engine fuel supply rate; means responsive to the static pressure at a first point in said inlet downstream of the inlet throat; means responsive to the static pressure at a second point in said inlet downstream of the inlet throat and spaced from said first point; reversible motor means operatively connected to said auxiliary regulating mechanism for the engine fuel supply, said reversible motor means continuously operating during engine operation and having first and second directions of operation for increasing and decreasing, respectively, said engine fuel supply rate; means responsive to changes in the relative magnitude of said pressures; and means controlled by said responsive means for reversing the direction of operation of said motor means every time the relative magnitude of said pressures goes through a peak value such that operation of said motor means is initiated in a direction to increase said fuel flow when said inlet has started and said relative pressure magnitude is a predetermined amount less than its peak value and on the side of said peak value corresponding to inlet pressure recovery substantially less than peak pressure recovery and operation of said motor means is initiated in the reverse direction to decrease said fuel flow when said relative pressure magnitude is on the other side of and a predetermined amount less than its peak value.

5. A control system for a jet engine having an air inlet through which air enters at supersonic velocity during engine operation; said system comprising means responsive to the static pressure at a first point in said inlet downstream of the inlet throat; means responsive to the static pressure at a second point in said inlet of the inlet throat and spaced from said first point; means operable for varying the rate of engine fuel supply; reversible motor means operatively connected to said fuel supply varying means, said reversible motor means continuously operating during engine operation and having first and second directions of operation for increasing and decreasing, respectively, said engine fuel supply rate; means including a thyratron tube responsive to the relative magnitude of said pressures such that said thyratron tube fires every time said relative magnitude of said pressures goes through a peak value; and reversing switch mechanism controlled by said thyratron tube and operatively connected to said motor means for reversing said motor means every time said thyratron tube fires.

6. A control system for a jet engine having an air inlet through which air enters at supersonic velocity during engine operation; said system comprising means providing a signal which has a peak value when the engine is operating substantially at but somewhat below the peak pressure recovery of the inlet; means operable to regulate the engine thrust; reversible motor means continuously operating during engine operation and operatively connected to said thrust regulating means and controlled by said signal so as to operate in one or the other direction for increasing or decreasing the engine thrust through a range of values sufficient to cause said signal to pass through its said peak value such that operation of said motor means is initiated in a thrust increasing direction when said inlet has started and said signal is a predetermined amount less than its peak value and on the side of said peak value corresponding to inlet pressure recovery substantially less than peak pressure recovery and operation of said motor means is initiated in the reverse direction to decrease the engine thrust when said signal is on the other side of and a predetermined amount less than its peak value.

7. Control apparatus for an aircraft jet engine having an air inlet through which, during engine operation, air enters at supersonic velocity for combustion therein; said apparatus comprising means providing a first signal which is a measure of the mass air flow into the engine; means providing a second signal which has a peak value when the engine is operating substantially at but somewhat below the peak pressure recovery of the inlet; reversible motor means continuously operating during engine operation and responsive to said second signal for modifying said first signal; and fuel regulating mechanism including means responsive to said modified signal for regulating said fuel supply, said reversible motor means being operable in a direction so as to effect a progressive increase in the fuel-air ratio of the engine combustible mixture when said second signal is a predetermined amount less than its peak value and on the side of its peak value corresponding to inlet pressure recovery substantially below its maximum value and being operable in the opposite direction to effect a progressive decrease in said fuel-air ratio when said second signal is on the other side of its peak value.

8. Control apparatus for an aircraft jet engine having an air inlet through which, during engine operation, air enters at supersonic velocity for combustion therein; said apparatus comprising means providing a signal which has a peak value when the engine is operating substantially at but somewhat below the peak pressure recovery of the inlet; fuel regulating mechanism including means for controlling the fuel-air ratio of the engine combustible mixture; reversible motor means responsive to said signal and operatively connected to said mechanism for increasing and decreasing said fuel-air ratio depending on its direction of rotation such that operation of said motor means is initiated in one direction to effect a progressive increase in said fuel-air ratio when said signal is a predetermined amount less than its peak value and on the side of said peak value corresponding to inlet pressure recovery substantially less than peak inlet pressure recovery and operation of said motor means in the opposite direction is initiated to effect a progressive decrease in said fuel-air ratio when said signal is on the other side of and a predetermined amount less than its peak value.

References Cited in the file of this patent

UNITED STATES PATENTS

| | | |
|---|---|---|
| 2,461,266 | Gay | Feb. 8, 1949 |
| 2,540,594 | Price | Feb. 6, 1951 |
| 2,638,738 | Salter | May 19, 1953 |
| 2,687,612 | Anderson et al. | Aug. 31, 1954 |
| 2,734,340 | Wood | Feb. 14, 1956 |
| 2,766,579 | Gallo et al. | Oct. 16, 1956 |
| 2,777,289 | Boucher | Jan. 15, 1957 |
| 2,796,730 | Lawrence | June 25, 1957 |
| 2,867,084 | Criswell | Jan. 6, 1959 |

FOREIGN PATENTS

| | | |
|---|---|---|
| 1,086,376 | France | Oct. 11, 1954 |
| 769,101 | Great Britain | Feb. 27, 1957 |